US 7,927,407 B2
(12) United States Patent
LeConey et al.

(10) Patent No.: US 7,927,407 B2
(45) Date of Patent: Apr. 19, 2011

(54) DESICCANT BAG AND FILTER ASSEMBLY (75) Inventors: Douglas E. LeConey, Clayton, OH (US); John M. Evans, Piqua, OH (US); David V. Flaugher, Beavercreek, OH (US)

(73) Assignee: Flow Dry Technology, Inc., Brookville, OH (US)

( * ) Notice: Subject to any disclaimer, the term of this patent is extended or adjusted under 35 U.S.C. 154(b) by 174 days.

(21) Appl. No.: 12/227,109

(22) PCT Filed: May 2, 2007

(86) PCT No.: PCT/US2007/010539
§ 371 (c)(1),
(2), (4) Date: Nov. 7, 2008

(87) PCT Pub. No.: WO2007/133447
PCT Pub. Date: Nov. 22, 2007

(65) Prior Publication Data
US 2009/0090244 A1 Apr. 9, 2009

Related U.S. Application Data (60) Provisional application No. 60/873,686, filed on Dec. 8, 2006, provisional application No. 60/798,944, filed on May 9, 2006.

(51) Int. Cl.
*B01D 53/02* (2006.01)
(52) U.S. Cl. .............. 96/134; 96/135; 96/136; 96/147; 55/514
(58) Field of Classification Search ............ 96/134–136, 96/147; 55/318, 490, 514
See application file for complete search history.

(56) References Cited

U.S. PATENT DOCUMENTS

| 3,443,367 | A | | 5/1969 | Bottum |
| 5,228,315 | A | | 7/1993 | Nagasaka et al. |
| 5,666,791 | A | | 9/1997 | Burk |
| 5,667,566 | A | * | 9/1997 | Flynn et al. ................. 96/117.5 |
| 5,716,432 | A | | 2/1998 | Perrine |
| 5,813,249 | A | | 9/1998 | Matsuo et al. |
| 6,106,596 | A | * | 8/2000 | Haramoto et al. ............. 96/135 |
| 6,155,072 | A | | 12/2000 | Sullivan et al. |
| 6,170,287 | B1 | | 1/2001 | Leitch et al. |
| 6,279,341 | B1 | | 8/2001 | Incorvia et al. |
| 6,360,560 | B1 | | 3/2002 | Whitlow et al. |
| 6,395,074 | B1 | | 5/2002 | Mastromatteo |
| 6,449,977 | B1 | | 9/2002 | Incorvia et al. |
| 6,474,098 | B2 | | 11/2002 | Perrine et al. |
| 6,579,351 | B2 | * | 6/2003 | Fisk et al. ....................... 96/134 |
| 6,622,517 | B1 | | 9/2003 | Whitlow et al. |

(Continued)

FOREIGN PATENT DOCUMENTS

EP 1 079 186 A1 2/2001

(Continued)

*Primary Examiner* — Duane Smith
*Assistant Examiner* — Christopher P Jones
(74) *Attorney, Agent, or Firm* — Wegman, Hessler & Vanderburg (57) ABSTRACT Desiccant bag and filter assembly adapted for insertion into an integrated condenser dryer chamber of a vehicle or mobile air conditioning system or the like. A support member (4) lies along the exterior of a desiccant containing pouch (2) with the pouch secured at both of its longitudinal ends to the support. A filter member is integral with the assembly and positioned at one end of the pouch. Rigid stand off members (10, 18) are positioned at respective ends of the assembly.

5 Claims, 6 Drawing Sheets

U.S. PATENT DOCUMENTS

| | | |
|---|---|---|
| 6,640,582 B2 | 11/2003 | Incorvia et al. |
| 6,694,773 B1 | 2/2004 | Snow et al. |
| 6,763,679 B1 | 7/2004 | Leitch et al. |
| 6,981,389 B2 | 1/2006 | Knecht et al. |
| 7,003,978 B2 | 2/2006 | Knecht et al. |
| 2003/0070551 A1* | 4/2003 | Fisk et al. .................. 96/134 |
| 2004/0007012 A1 | 1/2004 | Lee et al. |
| 2005/0066685 A1 | 3/2005 | Kent et al. |

FOREIGN PATENT DOCUMENTS

| | | |
|---|---|---|
| EP | 1 464 902 A2 | 10/2004 |
| EP | 1 477 750 A1 | 11/2004 |
| EP | 1 521 048 A1 | 4/2005 |
| EP | 1 566 600 A1 | 8/2005 |
| EP | 1 574 795 A1 | 9/2005 |
| WO | WO 03/089852 A1 | 10/2003 |
| WO | WO 2004/103829 A2 | 12/2004 |

\* cited by examiner

DESICCANT BAG AND FILTER ASSEMBLY

CROSS-REFERENCE TO RELATED APPLICATIONS

This application is a national stage entry of PCT/US2007/010539, filed May 2, 2007, which claims the priority benefit of U.S. Provisional Patent Application Ser. No. 60/798,944, filed May 9, 2006 and U.S. Provisional Patent Application Ser. No. 60/873,686, filed Dec. 8, 2006.

BACKGROUND OF THE INVENTION

1. Field of Invention

The present application pertains to a desiccant containing package and combined filter for use in an integrated condenser dryer and more particularly relates to an improved combination of desiccant pouch or bag and associated filter for insertion into an integrated condenser dryer chamber of a vehicle or mobile air conditioning system.

2. Background

Mobile air conditioning systems typically include an integrated condenser dryer chamber or receiver chamber that serves as an accumulator reservoir for refrigerant. The dryer chamber provides a convenient location for a container or package of desiccant material, usually a bag or pouch of mesh material, which absorbs water vapor from the liquid refrigerant reservoir. The pouch is normally spaced from the top and bottom of the chamber by elongated rod-like structures sometimes referred to as "stand off" members that serve to locate the pouch at the proper location in the chamber so that it will be positioned properly with respect to location of fluid entry and exit channels that communicate with the chamber from the header.

Most of these chambers are in the form of small diameter tubular receivers that are juxtaposed along one of the condenser headers in an integrated condenser/receiver for an automotive air-conditioning system or the like. These integrated condenser/receiver structures eliminate the need for separate tubing to connect the condenser with the receiver and have become popular due to their reduced spatial requirements as compared with earlier designs. For instance, the overall dimensions of one integrated condenser/receiver proposed in U.S. Pat. No. 5,813,249 are from about 300 mm-400 mm in height and about 300 mm-600 mm in width.

In the integrated condenser/receiver design proposed in the '249 patent, the axes of the receiver canister and the associated header lie parallel to each other and are positioned adjacent the condensing unit. The desiccant-containing package positioned in the receiver dries refrigerant fluid (and the oil and moisture entrained therein) before the dried refrigerant enters a supercooler unit formed integrally with the condenser. Ultimately, when the desiccant material becomes saturated with contaminants, the desiccant material is spent and must be replaced.

Whether the desiccant material is being installed initially in the tubular chamber or whether it is being removed and replaced with a fresh desiccant package, it is desirable that a single desiccant containing unit be easily gripped and placed in the chamber for ease of insertion and withdrawal. Further, to ensure proper spacing from the top and bottom of the chamber, stand off members should be provided, that are preferably integrally with the desiccant containing structure.

SUMMARY OF THE INVENTION

Accordingly, a desiccant bag and filter assembly are provided that can be easily assembled and inserted into an automotive AC integrated dryer. The combined desiccant bag and filter assembly provides a low cost alternative with the assembly structure being easily adapted to accommodate different desired bag weights and sizes. The assembly also provides for low cost filtration and has adequate filtration surface area.

In one exemplary embodiment, the desiccant bag is supported along an elongated exterior support member by the provision of posts or the like that are provided in the support member and extend respectively through longitudinal ends of the bag. Other attachment means may be utilized for securing the bag to the support such as screws, rivets, heat and sonic sealing methods.

In one disclosed embodiment, the support member and bag both are elongate structures and include proximate ends and distal ends. At the distal end of the support member, an integral stand off or stop member is provided so as to help in positioning the assembly in the integrated dryer/condenser tube or canister. The stand off member also serves as a manual handle during operator insertion and/or removal of the assembly from the fluid flow tube or canister. At the proximate end of the support member, an elongated flap extension of the desiccant pouch or bag may be provided to cover a central opening in the filter housing that is defined by a tubular section of the support. Energy directors or the like can, for example, be disposed along the terminal portion of the filter housing adjacent to this flap or extension so as to help in the bonding of the flap to the housing via ultrasonic or other bonding techniques. See, U.S. Pat. No. 5,716,432.

In one exemplary embodiment, the filter housing is formed integrally with the support member. The housing is substantially circular in cross-section and may include radially extending fins which help to distribute fluid flow as it passes through the filter. A central extension is provided at the proximate end of the support member to serve as a stand off to help locate the assembly in the integrated dryer/condenser canister or other fluid flow tube.

In another embodiment, the filter may be insert molded together with the support and have several screen hole openings therein with the filter medium being molded with and attached to the filter housing as a part of the co-molding process. Alternatively, the filter may be detachably mounted to the support via snap fitting or otherwise, so that its dimensions can be varied to fit the diameter of the mating part of the assembly.

In another exemplary embodiment, a plastic land or mounting area is provided along the support so that the desiccant bag may be mounted to the support at each bag end. The desiccant bag is provided with a hole at each end through commonly available manufacturing methods. The bag is attached to the mounting area by inserting a post carried by the support through the hole on one end of the bag, stretching it slightly, and inserting the opposite end of the bag through the second post.

The desiccant bag or pouch may be made of polyester felt, non-woven spun bonded nylon material available under the Cerex PBN:II assignation from Cerex Advanced Fabrics, Pensacola, Fla., Reemay (spun bonded polyester) or other suitable material and, in accordance with one embodiment, is produced with an extension at one end thereof. The extension comprises a non-welded material at one end which serves as a filter medium for the assembly. The dimensions of this area are slightly larger in length and width dimensions of a molded plastic area such that it can be ultrasonically welded together on the perimeter, using a common energy director. Once this area is welded and securely attached to avoid any bypass of refrigerant, 100 percent of the refrigerant must pass through the middle of the polyester unwelded material and will be subjected to the filtration properties of the polyester felt.

In another exemplary embodiment, the filter is made of a commonly available micron-rated filter mesh that is insert molded to a separate filter housing component. The filter housing can be integral with the support and all of these parts i.e., support, filter housing and filter medium can be provided by an insert or co-molding technique.

In another embodiment, a cage-type filter is provided. This version may provide enhanced stability/rigidity for the cage to allow it to be inserted into the dryer can. In this version, the extension is integrally formed with the support member and includes radially extending fins or the like that are connected with a spider member of the support. A separate filter may be snap fitted over the extension and supporting spider member. As in accordance with one exemplary embodiment, the extension is coaxial with the filter and the proximate end thereof fits within a reduced diameter section of the filter housing.

In yet another embodiment, a planar heat seal area separates the desiccant bag from a circular cross-section sleeve or half bag portion. The half bag is then used as the filter medium. The proximate end of the half bag is securely attached to the tubular end of the support member and a cap is provided at the end of the support. The cap includes fluid flow passages therein and also includes a centrally disposed extension at the proximate end of the assembly. In this embodiment, the desiccant bags are made in accordance with normal procedure, but instead of cutting the bag at the horizontal seam after it is filled with desiccant beads or the like, a new pouch chamber is produced. This new chamber is not filled but simply cut off in the middle to make the sleeve or half bag portion which together with the tubular support end function as a filter.

This proximate end of the half bag or sleeve may be attached to the cap member by a variety of structural combinations such as those shown for instance in U.S. Pat. No. 6,474,098 incorporated by reference herein. Also, the cap structure shown in the '098 patent may also be used. The attachment method of the half bag to the cap/filter can be made, without limitation, by heat sealing, ultrasonic sealing, interference fits, or a "staking" or pitching action. A flexible seal located around the circumference of the tubular support helps to eliminate the risk of pulling the cap away from the desiccant bag or spilling desiccant (in case the half bag is filled with desiccant or other desiccant fill bag is positioned adjacent the support) if the seal becomes tightly lodged in the dryer tube. It is understood that the seal serves to provide a seal along the interface of the dryer tube and the filter housing. The cap and associated stand off extension serve to: (1) complete the interference fit between the half bag and the plastic cage; (2) hold the filter pouch section in place to eliminate bypass of the fluids; and (3) hold the entire assembly a proper measured distance away from the bottom of the aluminum dryer can with the stand off, which can be adjusted to the size of the mating dryer can.

The invention will be further described in conjunction with the following detailed description and appended drawings.

DETAILED DESCRIPTION OF EXEMPLARY EMBODIMENTS

Figure 1:
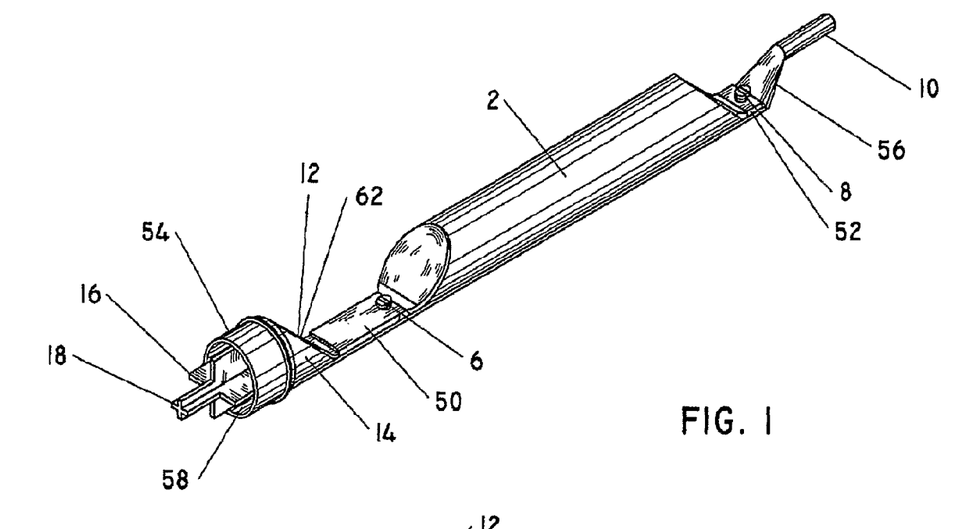
FIG. 1 is a perspective view of one embodiment of the invention.

Turning first to FIG. 1, there is shown a desiccant bag/support member embodiment in accordance with the invention. In the embodiment, as shown, a desiccant bag or pouch 2 is provided having a proximate end 50 and a distal end 52. The pouch is adapted to contain in its interior portions, desiccant beads or other desiccant material. The pouch itself is air permeable and may be composed of non-woven textile materials for example, such as spun bonded nylons, polyesters, or other felt-like material. An elongated support member or band 4 is provided exterior to the pouch and supports the pouch along its entire length, as shown. The support also includes a proximate end 54 and a distal end 56.

Figure 1A:
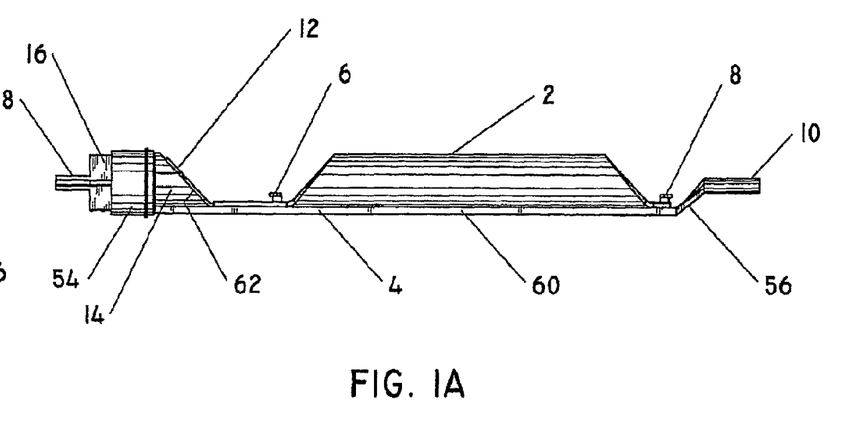
FIG. 1A is a side elevational view of the embodiment shown in FIG. 1.
Figure 1B:
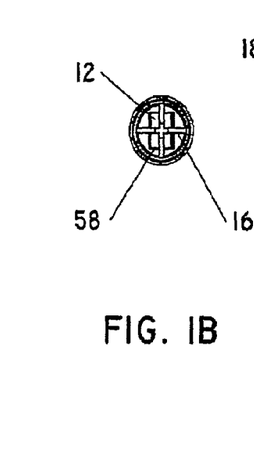
FIG. 1B is an end view of the left hand end of the embodiment shown in FIG. 1A.

As shown in FIG. 1, the pouch 2 is secured to the support member 4 via the use of posts 6, 8 positioned along the support member that cooperate with apertures in the hardened or fused areas of the desiccant bag or pouch to secure the pouch to the support. As further shown in this embodiment, a stand off member 10 is provided at the distal end of the support so as to facilitate grasping and location of the desiccant bag/support assembly within the canister housing of the integrated condenser/receiver or other fluid flow housing. Also, as shown in FIG. 1A, the support comprises a generally planar section 60 and an angled section 62 with the section 62 being provided with a filter opening 58 therein. In this embodiment, a pouch extension or flap 12 is provided at the proximate end of the pouch. This flap serves as a filter medium as it extends over the opening 58 provided in angled section 62 of the support. A filter housing 14 is provided in the proximate end of the support and is in the form of an open collar or the like having an angled front face. The fins 16 extend radially from the stand off extension 18 with the extension 18 serving as a stand off type mechanism so as to provide for proper location of the assembly within the housing. The fins 16 also help to direct flow of refrigerant fluid or air passing through the pouch extension 12 and associated filter opening 58 provided in filter housing 14.

Figures 2, 2A:
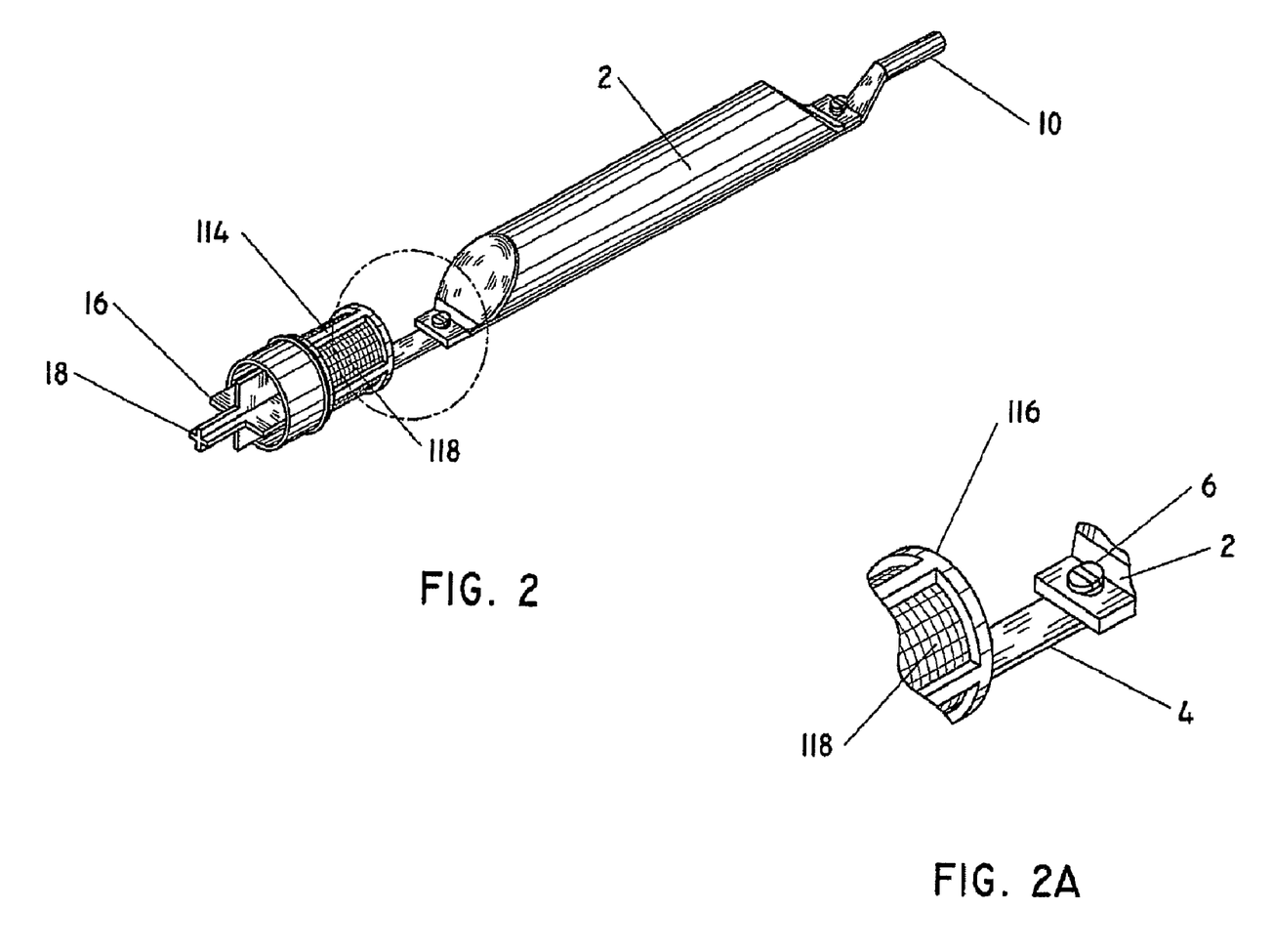
FIG. 2 is a perspective view of another embodiment having a cage-like filter housing that is integrally molded with the support member.
FIG. 2A is an enlarged cut away view of the assembly shown in FIG. 2 with the portion of the assembly shown in encircled phantom line section of FIG. 2 magnified for better clarity.

Turning now to the embodiments shown in FIGS. 2 and 2A, here, the filter is a cage filter type assembly 114, comprising a generally cylindrical shaped housing 116 and filter media 118 supported by the housing. As shown, this embodiment depicts an integral support/filter assembly wherein the cage filter and filter media 118 can be co-molded with the support member in accordance with conventional molding techniques wherein the filter media 118 is placed in the mold with desired plastic material being molded around same to form the cage filter 114.

Figure 3:
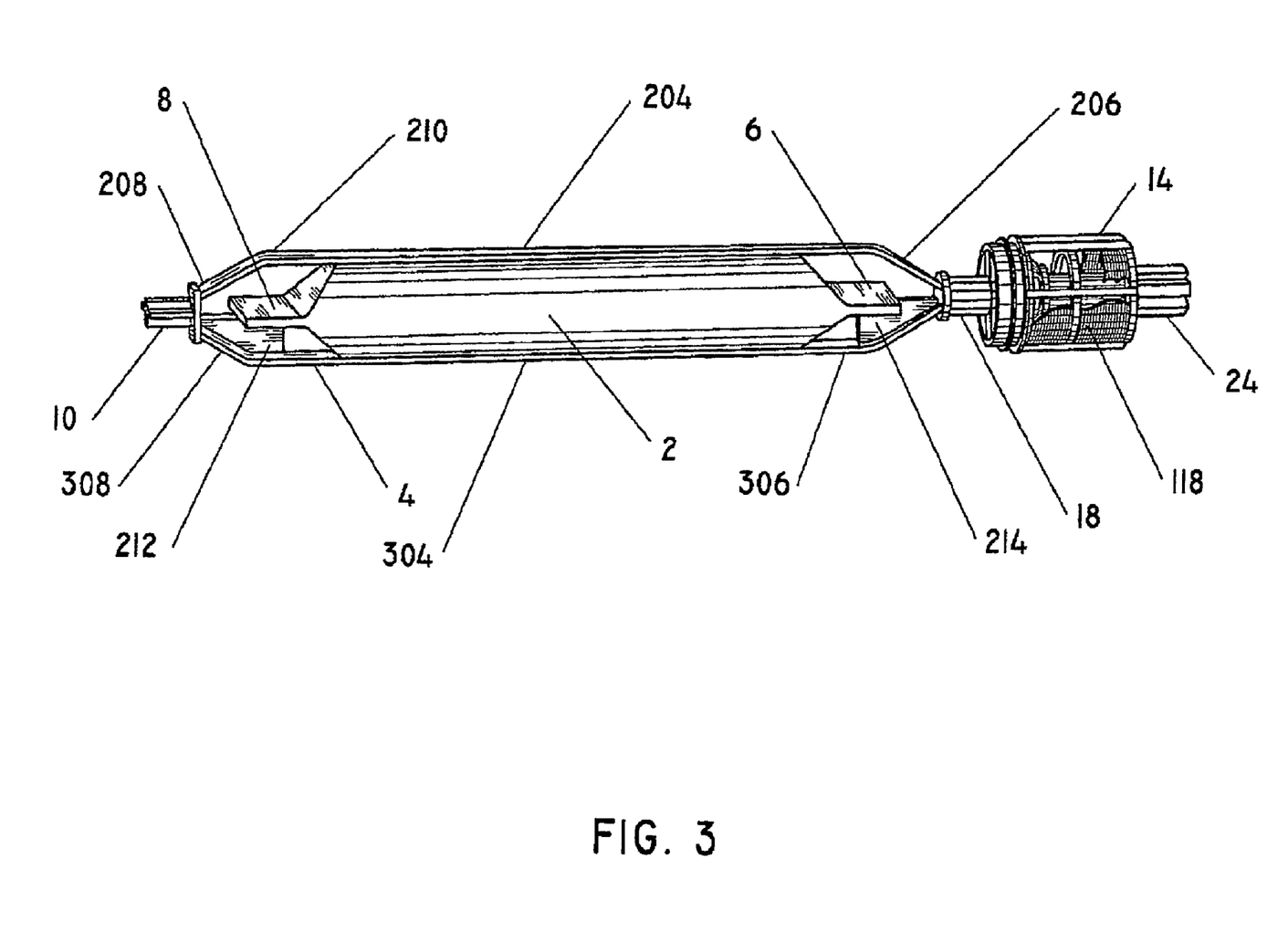
FIG. 3 is an orthogonal view of another embodiment wherein a snap fit connects the filter housing to the bag support.
Figures 4, 5:
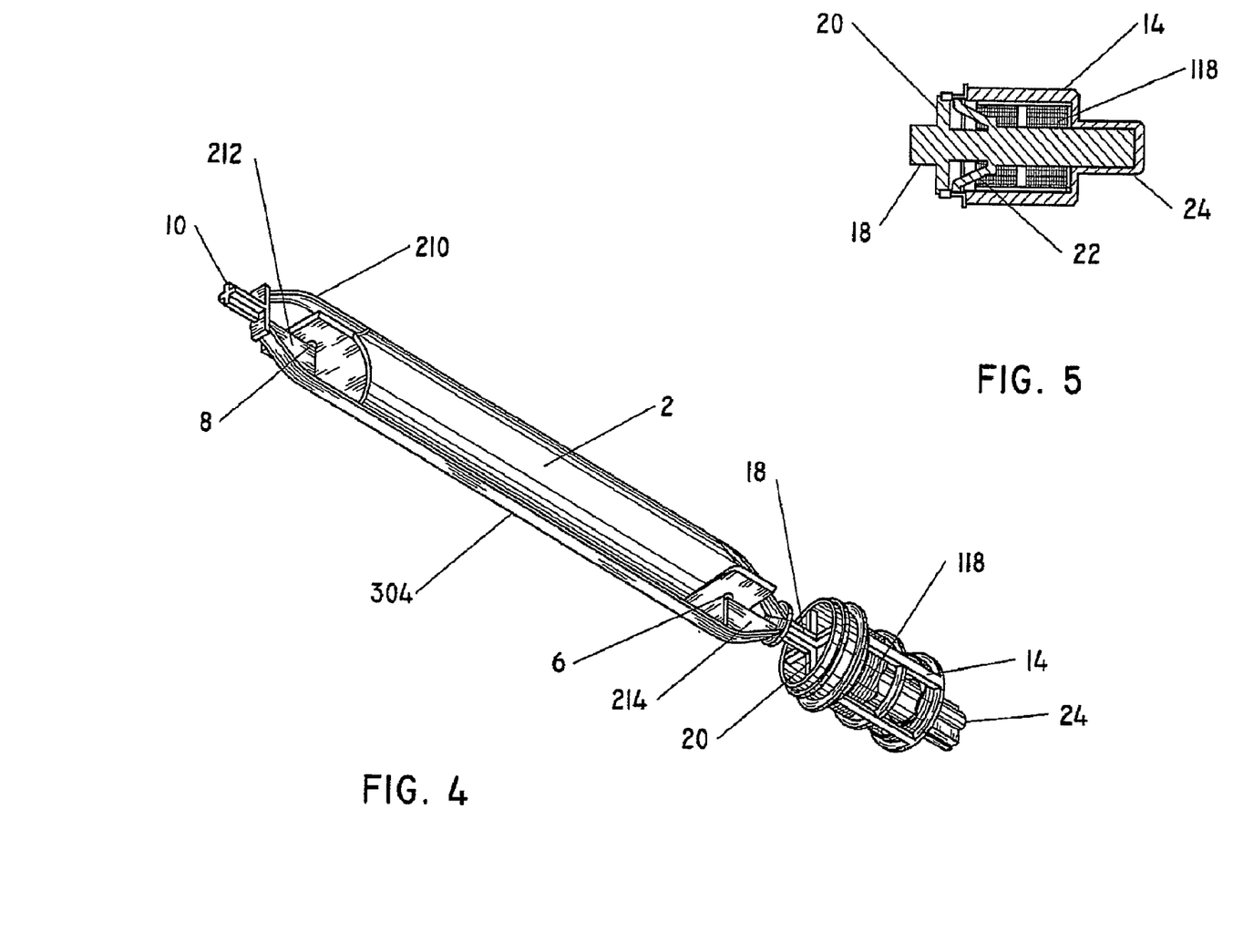
FIG. 4 is a perspective view of the embodiment shown in FIG. 3.
FIG. 5 is a transverse cross-sectional view of the filter assembly of the embodiment shown in FIG. 4.

Turning now to FIGS. 3-5 of the invention, there is shown an embodiment wherein the filter is detachably mounted to the support, in this embodiment via a snap-in type arrangement. As shown in a cage-like filter is snap fit over the extension 18 of the support and is received within a reduced section 24 of the filter housing. As may be better seen in FIG. 5, the extension 18 of the support may be provided with a spider 22 composed of radially extending arms or the like which are detachably connected, in this case, snap fit into the housing 14 of the filter. A reduced diameter section 24 of the filter housing is provided so as to receive the extension 18.

It is noted that in the embodiment shown in FIGS. 3-5, the support comprises two elongated band members 204, 304. The band 204 comprises a distal end 206 and a proximate end 208. Band 304 comprises distal end 306 and proximate end 308. The bands are joined at the respective distal and proximate ends to form a generally oblong-shaped yoke 210 that serves as the support with bag 2 cradled or supported therein. Land members 212 and 214 are provided on the bands of the yoke and serve as attachment points for the distal and proximate ends of the pouch 2 to the support.

Figure 6:
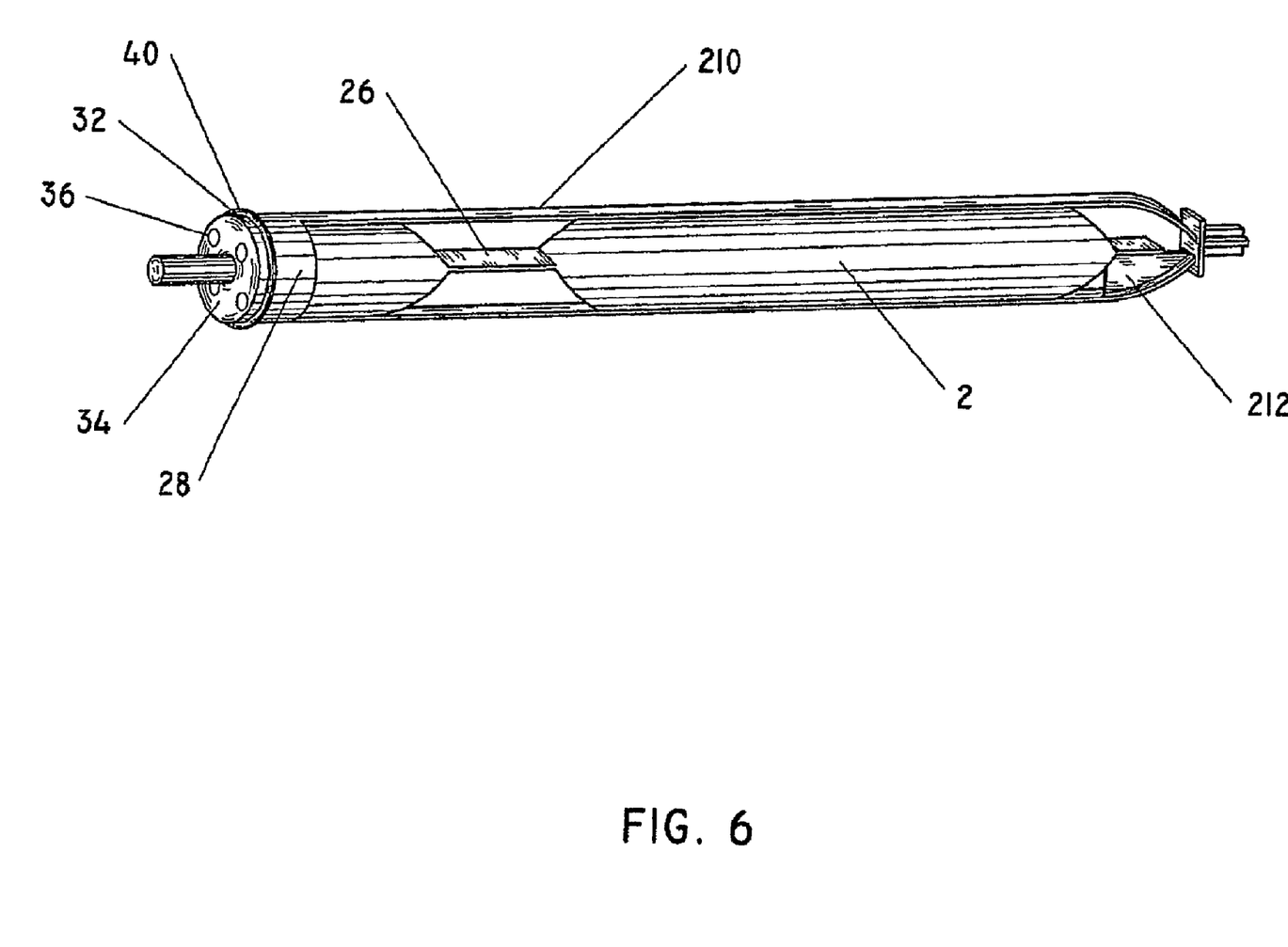
FIG. 6 is an orthogonal view of another embodiment of the invention.
Figures 7, 8:
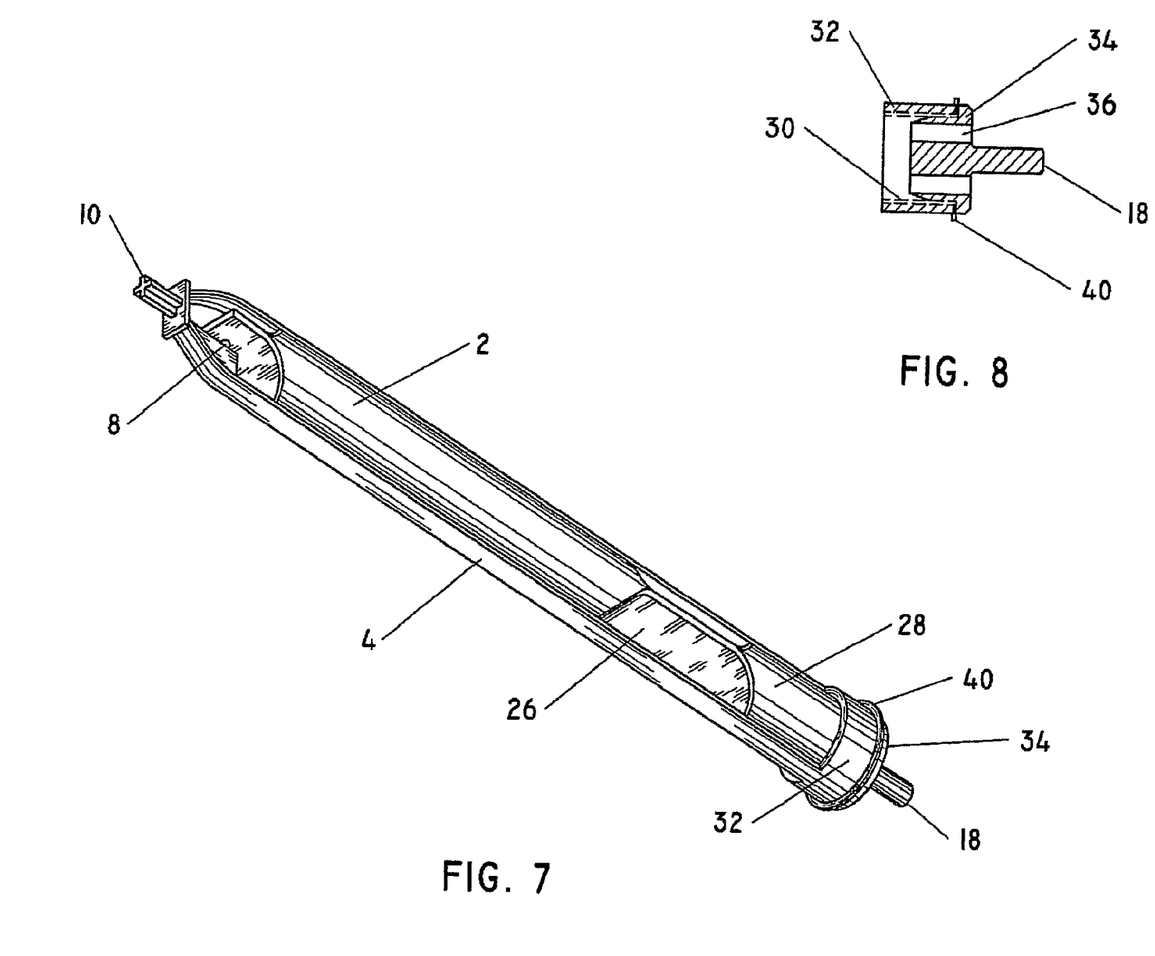
FIG. 7 is a perspective view of the embodiment shown in FIG. 6.
FIG. 8 is a transverse cross-sectional view of the filter assembly of the embodiment shown in FIG. 7.

Another embodiment of the invention is shown in FIGS. 6-8 wherein the yoke-type support is also provided. However, in this case, an intermediate section comprising a planar heat sealed area 26 of the pouch is provided with a sleeve or half-bag area 28 of the pouch extending away from the planar heat sealed area 26. In this embodiment, the sleeve or half-bag 28 serves as a filter media and is fixedly attached to the tubular end 32 of the support. A cap 34 is received in the tubular support member and comprises fluid flow passages 36 therein to serve as a filter. Together, the filter comprises a housing composed of the support member and cap with the sleeve or half-bag member 28 serving as the filter media. A seal 40, such as an o-ring or the like, may be provided around the collar to help seal the assembly within the canister housing.

Accordingly, the desiccant/filter assembly comprises, in various embodiments, an elongated pouch member that includes an interior adapted for reception of desiccant therein and an exterior, air permeable material. The pouch member extends along its length from a proximate end to a distal end. In accordance with the invention, a support is located exterior to and supports the pouch member along its length with the pouch being mounted on the support. A filter is attached to the support and located proximate one of the pouch member ends.

In another embodiment, the support is an elongated band member having a proximate end and a distal end and wherein the proximate end of the pouch member is attached to the proximate end portion of the support with a distal end of the pouch being attached to the distal end of the support member. The pouch may comprise a pouch extension which serves as the filter medium as it extends over an open area that may be formed along one end of the support material.

As is shown in FIG. 2, the filter itself may be integral with the support and such an integral structure may be provided via conventional co-molding techniques or the like. Alternatively, the filter may be detachably mounted to one end of the support as shown in the embodiment depicted in FIGS. 3-5.

In another embodiment of the invention, the filter comprises an angled face section of the support which is formed with a tubular housing section of the support to serve as the filter housing. An aperture is provided in the angled section, and, in one exemplary embodiment, a flap extension of the pouch member is secured over the aperture so that the pouch member extension serves as the filter media and the support member itself functions as a filter housing.

In another exemplary embodiment, a sleeve or half-bag extension of the pouch is provided and cooperates with a tubular collar section of the support to define the filter assembly with the sleeve extension or half-bag portion of the pouch serving as the filter medium.

As shown in various embodiments, the support may comprise two generally planar band members joined at their respective proximate and distal ends in the form of an oblong shaped yoke member that surrounds and supports the desiccant pouch. Land members may be formed in each of the bands to serve as mounting locations whereby the respective ends of the bag or pouch are secured to the yoke.

Although this invention has been described in conjunction with certain specific forms and modifications thereof, it will be appreciated that a wide variety of other modifications can be made without departing from the spirit and scope of the invention.

What is claimed is:

1. A desiccant/filter assembly comprising
   (a) a pouch member comprising an interior adapted for reception of desiccant therein and an exterior composed of an air permeable material, said pouch member extending along its length from a proximate end to a distal end;
   (b) a support located exterior to and supporting said pouch member, with said pouch member mounted to said support; and
   (c) a filter attached to said support and located proximate one of said pouch member ends;
   wherein said support is an elongated member having a proximate end and a distal end and wherein said proximate end of said pouch member is attached to said proximate end of said support and said distal end of said pouch is attached to said distal end of said support;
   wherein said pouch member comprises a pouch extension, said filter comprising an open area formed at one end of said support with said pouch extension extending over said open area to provide a filter medium;
   said pouch extension comprising a sleeve extension of said pouch, said sleeve extension connected to said pouch through a planar sealed area of said pouch, one end of said support comprising a tubular collar, wherein said sleeve extension and said collar are fixedly attached to each other to define said filter.

2. Apparatus as recited in claim 1 further comprising a cap received in said collar and a stand off support extending from said cap away from said pouch member.

3. A desiccant/filter assembly comprising
   (a) a pouch member comprising an interior adapted for reception of desiccant therein and an exterior composed of an air permeable material, said pouch member extending along its length from a proximate end to a distal end;
   (b) a support located exterior to and supporting said pouch member, with said pouch member mounted to said support; and
   (c) a filter attached to said support and located proximate one of said pouch member ends;
   wherein said support comprises a pair of elongated band members, each having a distal and proximate end with said bands joined to each other at said respective distal and proximate ends to form a yoke surrounding and supporting said pouch member, said yoke having a distal end and a proximate end formed at the respective joints of said distal and proximate ends of said bands.

4. Apparatus as recited in claim 3 wherein said distal and proximate ends of said yoke each comprise a land area extending from one of said bands toward the other, said distal and proximate ends of said pouch member secured to respective ones of said lands.

5. A desiccant/filter assembly comprising
   (a) a pouch member comprising an interior adapted for reception of desiccant therein and an exterior composed of an air permeable material, said pouch member extending along its length from a proximate end to a distal end;
   (b) a support located exterior to and supporting said pouch member, with said pouch member mounted to said support; and
   (c) a filter attached to said support and located proximate one of said pouch member ends;
   wherein said support is an elongated member having a proximate end and a distal end and wherein said proximate end of said pouch member is attached to said proximate end of said support and said distal end of said pouch is attached to said distal end of said support;
   wherein said pouch member comprises a pouch extension, said filter comprising an open area formed at one end of said support with said pouch extension extending over said open area to provide a filter medium, said pouch extension comprising a flap located at one end of said pouch and wherein said flap is secured over said open area, said support comprising an elongated band having a generally planar section contiguous to said pouch member and a filter support surface with an aperture therein angularly extending from said band at one of said band ends and defining said open area, said flap fixedly secured over said aperture.

* * * * *